2,715,626
Patented Aug. 16, 1955

2,715,626
PROCESS OF PREPARING DIHYDROCODEINONE

Karl Pfister III and Max Tishler, Westfield, N. J., assignors to Merck & Co., Inc., Rahway, N. J., a corporation of New Jersey No Drawing. Application July 5, 1950,
Serial No. 172,189

3 Claims. (Cl. 260—285)

This application relates to an improved method of preparing dihydrocodeinone, and more particularly to an improved process for oxidizing dihydrocodeine to dihydrocodeinone.

Dihydrocodeinone, a therapeutically valuable constituent in cough remedies can be prepared from thebaine, dihydrothebainone, codeinone and bromcodeinone, by various processes which have been described in the literature. However, these processes are unattractive commercially since all of the starting materials are in short supply, and in addition most of the processes result in only very small yields of the desired product. Another proposed method comprises reducing codeine to dihydrocodeine and then oxidizing the dihydrocodeine with chromic acid to produce the dihydrocodeinone. The first step of the latter process is readily effected in good yields but the chromic acid oxidation step is reported to yield only small amounts of dihydrocodeinone according to certain investigators, while other investigators were unable to obtain any of the desired product by this oxidation process. In accordance with another alternative method, codeine is rearranged under hydrogenating conditions in the presence of palladium catalyst and an acid to yield dihydrocodeinone. Although it is claimed that excellent yields of the product are obtained by this method, it has not been possible to duplicate these results. Also, the rearrangement reaction is complicated by the formation of a number of by-products which are difficult to separate from the desired product. Accordingly, heretofore, no satisfactory method was available for preparing dihydrocodeinone on a commercial scale.

This invention is concerned with an improved method of preparing dihydrocodeinone. It is one object of this invention to provide an improved method whereby dihydrocodeinone can be obtained in good yield from a readily available starting material. It is a further object to provide a practical process for oxidizing dihydrocodeine to dihydrocodeinone. Other objects will be apparent from the detailed description of the invention hereinafter provided.

According to the present invention dihydrocodeinone is readily obtained in high yields by intimately contacting dihydrocodeine with an organic metal oxide and a ketone. The starting material, dihydrocodeine, is prepared by hydrogenating codeine in the presence of a catalyst such as palladium. The process of the present invention may be illustrated by the following equation:

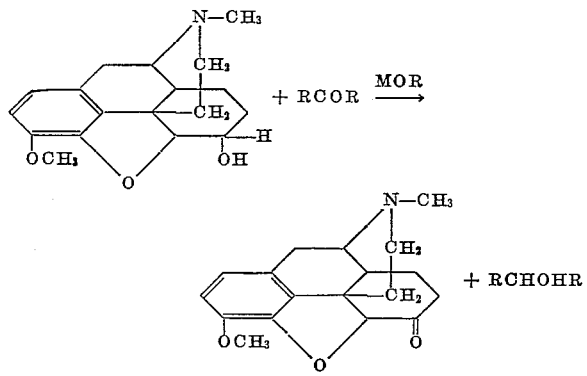

wherein R is an organic radical and M is a metal such as aluminum, an alkali metal, or an alkaline earth metal.

We have found that by reacting dihydrocodeine with cyclohexanone and an organic aluminum oxide such as aluminum tertiary butoxide or aluminum phenoxide, the dihydrocodeine is readily oxidized to dihydrocodeinone. Further in place of aluminum phenoxide or aluminum tertiary butoxide, we may also employ an aluminum cresolate. The reaction is preferably effected by heating the reactants under anhydrous conditions in an inert solvent medium. Suitable solvents for use in carrying out this reaction are dioxane, certain aliphatic hydrocarbons, aromatic hydrocarbons, and the like. In general, we prefer to use an aromatic hydrocarbon such as benzene, toluene or xylene as the inert solvent medium.

While satisfactory yields of dihydrocodeinone are obtained with the aluminum oxides mentioned above, the use of aluminum phenoxide is particularly advantageous in our process since under optimum conditions it is possible to recover a maximum yield of the desired product using this reagent.

In effecting the reaction in accordance with our preferred process, the dihydrocodeine is dissolved in the inert organic solvent medium, the cyclohexanone and organic aluminum oxide added thereto, and the reaction mixture heated under reflux until the reaction is completed. The reaction mixture is then allowed to cool and treated with an aqueous solution of a mineral acid resulting in the formation of two layers, an organic layer containing cyclohexanone, cyclohexanol and the inert solvent, and an acidic aqueous layer containing the dihydrocodeinone. The acidic aqueous layer is then added to an aqueous alkaline solution resulting in the precipitation of dihydrocodeinone which is separated from the solution, and, if desired may be purified further by crystallization from alcohol. Yields of dihydrocodeinone in excess of 70% of theory are obtainable by our process.

Generally, we find that optimum yields of the product are obtained when an excess of cyclohexanone is used in the reaction mixture. Preferably, about 5 moles of cyclohexanone per mole of dihydrocodeine are used.

The following examples are presented to illustrate specific embodiments of my invention.

Example 1

To a 250 cc. 3-neck flask equipped with agitator, thermometer, and downward condenser were added 100 cc. benzene, 6.02 g. (0.02 mole) dihydrocodeine (M. P.= 111–112° C.), and 9.8 g. (0.10 mole) cyclohexanone. (The dihydrocodeine was obtained by hydrogenation of codeine in aqueous acetic acid using palladium chloride catalyst.) The resulting solution was heated and 10 cc. of the distillate collected to remove any water. At the end of this distillation the inside temperature was 84° C. and the vapor temperature 81° C. The reaction was put on reflux and 6.12 g. (0.02 mole) aluminum phenoxide added. (The aluminum phenoxide was prepared by a method similar to that of Reichstein, Helv. Chim. Acta. 26, 511 (1943).) The clear, pale-orange solution was refluxed at 84° C. for twenty hours.

After cooling the solution to room temperature, 50 cc. of 2.5 N hydrochloric acid was added. The organic layer was separated and washed with 2 x 15 cc. of water; this layer contained benzene, cyclohexanone and cyclohexanol. The combined aqueous extract was washed with 3 x 20 cc. of ether and then added dropwise to 30 cc. of 30% sodium hydroxide plus 30 g. of ice and a trace of sodium hydrosulfite. A granular precipitate of dihydrocodeinone which, after cooling the slurry for one hour, was collected, washed free of alkali and dried at 50° C. The dihydrocodeinone so obtained was found to melt at 189–195° C.

This product was refluxed for ½ hour with 24 cc. of absolute ethanol, cooled in the icebox overnight, filtered, and washed with 5 cc. of cold ethanol. After drying the crystalline dihydrocodeinone was found to melt at 194.5–197° C.

*Example 2*

One-hundredth mole (3.19 g.) of dihydrocodeine hydrate was dehydrated by twice dissolving in toluene and concentrating to dryness. The residue was dissolved in a mixture of 50 cc. of toluene and 50 cc. of cyclohexanone, 10 g. of aluminum tertiary butoxide added, and the resulting mixture heated to reflux for 5¾ hours. After cooling, the turbid solution was extracted with 50 cc. of 2.5 N hydrochloric acid and the acidic extract washed with ether. The aqueous solution was then added dropwise to a mixture of ice and 30 cc. of 30% sodium hydroxide. After chilling, the product was collected by filtration, washed with water and dried. The dihydrocodeinone so obtained melted at 165–175° C. after sintering at 155° C.

Crystallization from alcohol gave white crystals of M. P.=191–195° C. A mixture with authentic dihydrocodeinone melted without depression. The product also gave a characteristic purple color with Marquis reagent.

*Example 3*

A solution of 3.19 g. of dihydrocodeine hydrate in 100 cc. of toluene and 50 cc. of cyclohexanone was heated to a boil and 15 cc. of distillate collected. After cooling somewhat, aluminum phenoxide (3.06 g.) was added to the hot solution which was then maintained between 85 and 90° for about 20 hours. After cooling, the reaction mixture was extracted with 25 cc. of 2.5 N hydrochloric acid and the aqueous extract washed several times with ether. The aqueous solution was added slowly to a mixture of 15 cc. of 30% sodium hydroxide and 15 g. of ice. After refrigerating for an hour the pale yellow precipitate was collected, washed with water and dried. The dihydrocodeinone so obtained had a melting point of 187–194° C.

Recrystallization from alcohol gave dihydrocodeinone of M. P. 194.5–196.5° C.

*Example 4*

The run was made as in Example 3 but the temperature was maintained at 70–75° for 30 hours. Crude yield, 87.3%. M. P. 185–192°. Recovery of dihydrocodeinone, M. P. 195.5–197.5°, 68.5% (overall yield, 59.8%.

Various changes and modifications in the foregoing procedure will occur to those versed in the art, and to the extent that such changes and modifications fall within the purview of the appended claims it will be understood that they constitute part of our invention.

We claim:

1. The process for preparing dihydrocodeinone which comprises reacting dihydrocodeine with cyclohexanone and aluminum phenoxide.

2. In the process for oxidizing dihydrocodeine to dihydrocodeinone, the step which comprises reacting dihydrocodeine with cyclohexanone and aluminum phenoxide by heating said reactants in an inert solvent medium.

3. A process for oxidizing dihydrocodeine to dihydrocodeinone which comprises reacting dihydrocodeine with cyclohexanone and aluminum phenoxide in an inert solvent.

References Cited in the file of this patent

UNITED STATES PATENTS

| | | |
|---|---|---|
| 2,379,832 | Serini et al. | July 3, 1945 |
| 2,384,335 | Oppenauer | Sept. 4, 1945 |

FOREIGN PATENTS

| | | |
|---|---|---|
| 415,097 | Germany | June 13, 1945 |

OTHER REFERENCES

Merck's Index (4th ed., 1930), page 202.